Figure 1:
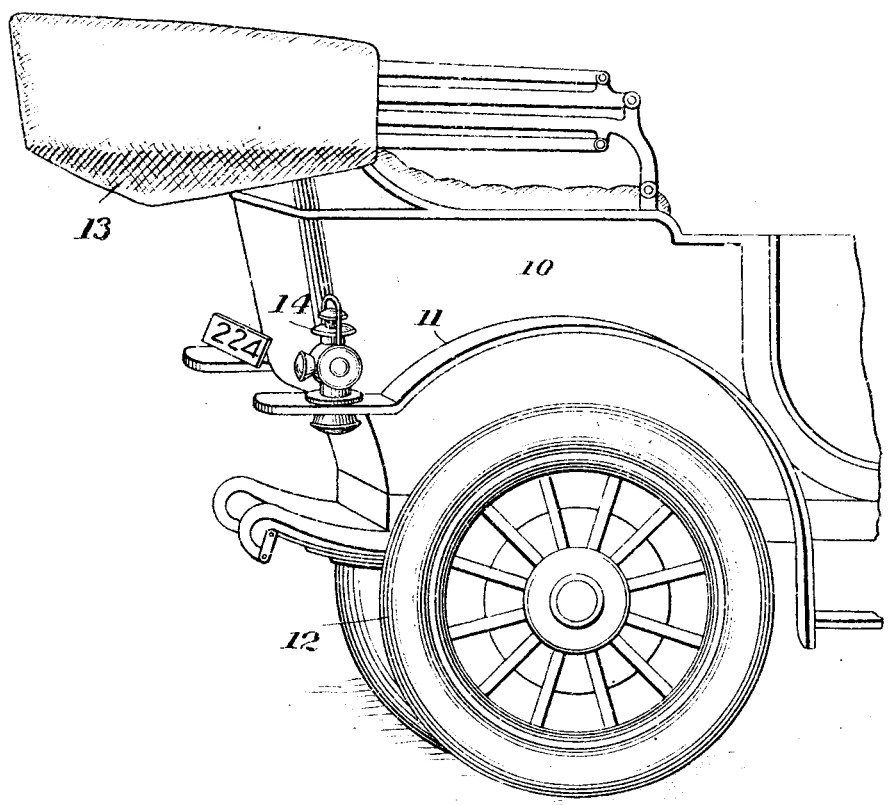

A. LOOMIS.
MOTOR VEHICLE.
APPLICATION FILED MAY 23, 1910.

1,131,395.

Patented Mar. 9, 1915.
2 SHEETS-SHEET 1.

Witnesses

Inventor
Allen Loomis
Attorneys

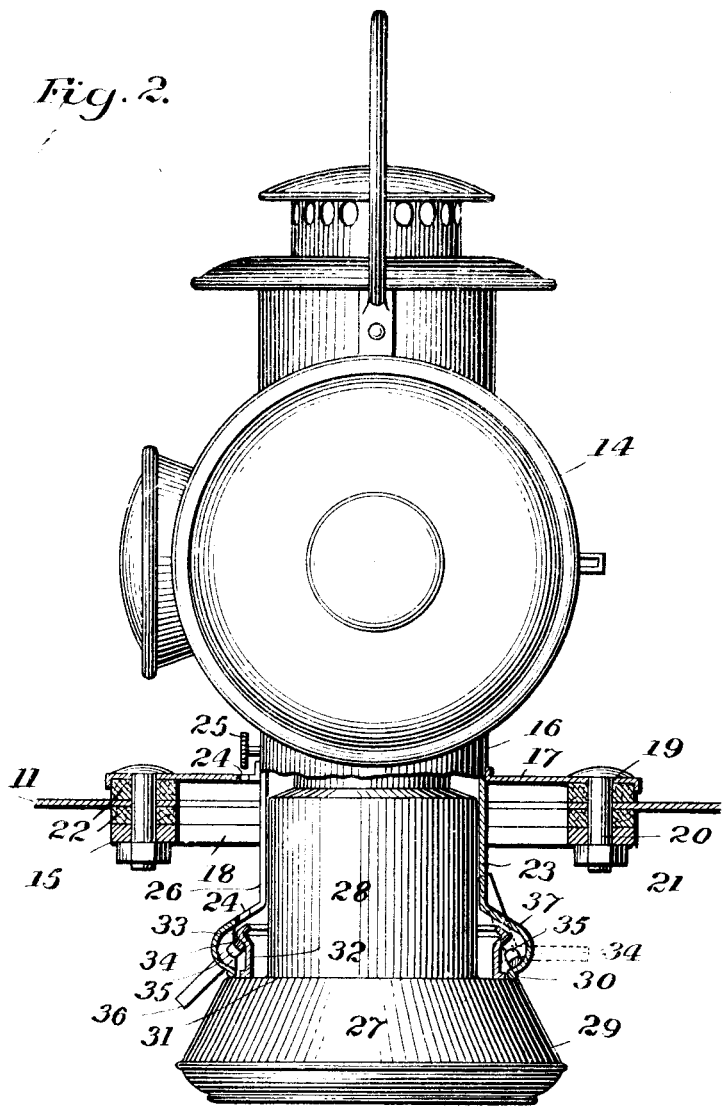

ature, including p
UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,131,395. Specification of Letters Patent. Patented Mar. 9, 1915.

Application filed May 23, 1910. Serial No. 563,029.

*To all whom it may concern:*

Be it known that I, ALLEN LOOMIS, a citizen of the United States, and resident of Detroit, county of Wayne, State of Michigan, have invented certain new and useful Improvements in Motor-Vehicles, of which the following is a specification.

This invention relates to motor vehicles and particularly to the lamps therefor and the means of attachment of the lamps to the vehicle.

The particular type of lamp in connection with which the invention is illustrated is the "tail lamp" which is usually suspended at the rear of the vehicle.

One of the objects of the invention is to construct a lamp and attaching means of simple and convenient form permitting the lamp to be securely attached to the body of the vehicle insuring it against excessive vibration and also permitting of the easy removal of the lamp from its support and of the fount from the lamp proper.

Another object of the invention is to so place the tail lamp on the vehicle rear fender, which fender is usually directly beneath a part of the vehicle top when the latter is in lowered position, that the main portion of the lamp, including the lenses, will be above the fender away from mud and dirt thrown up by the wheels and yet so that the lamp will be as low as possible on the vehicle to prevent the heat from the lamp scorching the top directly above it. This object is accomplished by extending the lower portion of the lamp through the fender and attaching the fount underneath the same.

Referring to the drawings, Figure 1 is a perspective view of a portion of a motor vehicle showing my invention incorporated therein; and Fig. 2 is an enlarged section through the tail lamp and the contiguous parts of the vehicle fender some of the parts of the lamp being shown in elevation.

The vehicle body is shown at 10 and to this the rear fenders 11 are secured in suitable positions over the rear wheels 12. The top 13 is shown in lowered position with an envelop covering the same. It will be noticed that a portion of this top is directly above the tail lamp 14 which is mounted on one of the fenders 11, but since the lower portion of the lamp is dropped through the fender the lamp is thus placed so low that there is no danger of scorching the material of the top.

In Fig. 2 the fender is shown at 11 and it is in part supported by a bracket 15 which is properly secured to the body of the vehicle, and this bracket 15 is of perforated disk form, the opening therein being large enough to receive the lower portion of the lamp. The body portion 16 of the lamp has a radially extending flange 17 secured thereto by any suitable means such as soldering, and this flange is somewhat larger than the opening 18 formed in the disk portion of the bracket 15 and forms the support for the lamp proper. Suitable holes 19 are drilled in the flange 17 to register with similar holes in the fender 11 and bracket 15 and these parts are all secured together by bolts 20 and nuts 21 with suitable wood or cork washers 22 respectively between the flange 17 and the fender 11 and the fender and the bracket 15, as shown particularly in Fig. 2.

The downwardly extending portion 23 of the lamp body is somewhat flared near its lower edge and this flared portion is provided with a T-shaped slot 24 as is also the flange 17 to permit the passage therethrough of the wick-turning spindle 25, and a vertical slot 26 is provided in the body portion for the same purpose. The fount 27 comprises an upper portion 28 which extends within and is surrounded by the body portion 23, and a lower enlarged portion 29 which may abut against the lower edge 30 of the body portion 23.

Secured to the shoulder 31 formed between the upper and lower portions of the fount is a ring 32 having an outwardly flared part forming a shoulder 33 against which the eccentric portions 34 of a pair of clamps 35 are adapted to rest when in the clamped position shown at the left in Fig. 2. The clamp is shown in inoperative position at the right in Fig. 2 and it may be moved from one position to the other by the handle 36. This clamping means alone is of well known construction. It will be understood that the clamping pieces 35 are journaled in the enlarged portions 37 of the lower flared part of the body portion 23 of the lamp. Thus the fount is detachably connected with the lower portion 23 of the lamp body without any rotative movement of the fount relative to the body as is required with a bayonet joint lock and similar constructions.

What I claim and desire to secure by Letters Patent is:

The combination with a support having an opening therethrough, of a lamp having a body portion adapted to extend through the opening and having a flange on the body portion larger than the opening and adapted to be secured to the support, said flange being arranged on the body portion above the bottom thereof, a fount extending into the body portion and removable from below said support, means below the support for detachably securing the fount to the body portion, and an adjusting device for the lamp above said flange.

In testimony whereof I affix my signature in presence of two witnesses.

ALLEN LOOMIS.

Witnesses:
R. H. ALLEN,
A. H. KNIGHT.